(12) United States Patent
Hammen et al.

(10) Patent No.: US 6,916,536 B1
(45) Date of Patent: Jul. 12, 2005

(54) COMPOSITES INCORPORATING COVALENTLY BONDED INTERSTITIAL POLYMER RESINS

(76) Inventors: Christopher R. Hammen, 4200 Fox Farm Rd., Missoula, MT (US) 59802; Richard F. Hammen, 4200 Fox Farm Rd., Missoula, MT (US) 59802

( * ) Notice: Subject to any disclaimer, the term of this patent is extended or adjusted under 35 U.S.C. 154(b) by 110 days.

(21) Appl. No.: 10/251,922

(22) Filed: Sep. 20, 2002

Related U.S. Application Data

(60) Provisional application No. 60/323,838, filed on Sep. 20, 2001.

(51) Int. Cl.$^7$ .................................................. B32B 5/16
(52) U.S. Cl. ........................ 428/407; 428/327; 428/331
(58) Field of Search ................................ 428/323, 331, 428/327, 403, 407

(56) References Cited

U.S. PATENT DOCUMENTS

| | | | | |
|---|---|---|---|---|
| 4,480,005 A | * | 10/1984 | Brownscombe | 428/336 |
| 4,690,749 A | * | 9/1987 | Van Alstine et al. | 204/454 |
| 5,750,258 A | * | 5/1998 | Sakai et al. | 428/405 |
| 5,952,093 A | * | 9/1999 | Nichols et al. | 428/323 |
| 6,383,500 B1 | * | 5/2002 | Wooley et al. | 424/401 |
| 6,436,476 B1 | | 8/2002 | Sage, Jr. | |
| 6,572,969 B1 | * | 6/2003 | Samaranayake | 428/407 |
| 6,689,715 B1 | | 2/2004 | Hammen et al. | |

FOREIGN PATENT DOCUMENTS

WO     WO 01/68240 A2     9/2001

* cited by examiner

Primary Examiner—H. Thi Lê
(74) Attorney, Agent, or Firm—RIchard F. Trecartin; Dorsey & Whitney LLP

(57) ABSTRACT

The present invention relates in general to the preparation of composites having filler particles and an interstitial polymer resin attached to the filler particles by a polyvalent tether.

19 Claims, 3 Drawing Sheets

Conceptual Picture of Co-Polymerization of Polybutadiene-Coated Silica and Polystyrene Conceptual Picture of Co-Polymerization of Polybutadiene-Coated Silica and Polystyrene

US 6,916,536 B1

COMPOSITES INCORPORATING COVALENTLY BONDED INTERSTITIAL POLYMER RESINS

This application claims the benefit of provisional application 60/323,838 filed Sep. 20, 2001.

FIELD OF THE INVENTION

The invention relates in general to the preparation and use of composites containing filler particles and an interstitial polymer resin attached to the filler by a multiplicity of covalent bonds.

BACKGROUND OF THE INVENTION

Modern society uses a variety of materials that were not in existence a generation ago. As technology progresses, the need has increased for stronger and lighter materials of construction to make products ranging in size from notebook computers to ships at sea. In the aerospace, automotive, and construction industries, engineers have been seeking ways to make their products as light as possible, while maintaining durability. Composite materials have been able to accomplish this task well. Composites, which are defined as a combination of both a filler and resin, are known for their very high strength to mass ratio. An important class of composite materials is formulated with a plastic or a resin and glass fillers. A commonly used composite material is fiberglass.

The strength and properties of composites depends upon the combination of filler and resin. Fillers, such as glass or silica, are frequently added to composites to lessen the amount of resin needed, and, as a result, reduce the cost of the composite. Fillers also change the physical properties of composites, compared to plastics or resins alone. For example, silica or glass microsphere fillers increase the compressive strength of composites, but also, sometimes decrease the tensile strength of the composite. Glass fiber fillers, on the other hand, are known to greatly increase the tensile strength of composite products and materials. Glass fiber fillers, on the other hand, are known to greatly increase the tensile strength of composite products and materials Although composite materials have been developed with remarkable strength, the most common place where the composites fail is at the interface of the filler and the resin. It is well known in the art that this failure is caused by a weak bond between the filler and the resin phase. The separation of the filler and resin has been identified by electron microscopy which provide images of the mechanical disruption at resin-filler interfaces. It has been clearly shown that structural failure of composites is related to the mechanical separation of the resin and the filler. The interface plays a very important role in the performance of composites. The interface is responsible for transferring stress from the matrix to the fibers/fillers and, therefore, high levels of matrix reinforcement are intimately related to the behavior of the interface as a stress transfer agent. Adhesion between reinforcing agents and matrix is the main interfacial property that should be maximized in order to improve stress transference. Many ways to improve adhesion in polymer composites are currently being investigated, i.e., chemical modification of surfaces such as by the use of the above-described silane coupling agent.

To increase the strength of the bond between the fillers and the resin, chemical modifications of filler surfaces have been made to change the properties of composites. The treatment of filler surfaces to change its chemical properties is called sizing. It is well known in the art that contact between resin and filler can be improved by proper sizing of the surface with chemical modifications that are compatible with the monomers and the polymerized resin system being used.

Sizing reagents are generally bifunctional molecules. One functionality of the molecule is designed to interact with the surface of the filler. In some cases the interaction is polar or ionic in nature. For example detergents to have been used to treat silica or clay fillers. The ionic end group of the detergents binds to the surface all of the clay filler. The hydrophobic tails of the detergents interact by Van der Waal's attractions with the polymer matrix of the resin in composites.

Recent in improvements in filler technologies have been made by using bifunctional sizing reagents that are capable of covalent reaction with the surface of the filler, and that also possess functional groups that can undergo covalent bond formation with the monomers used to make the polymers of a composite matrix. One important sizing reagent is aminopropyltriethoxysilane. The reagent condenses with the surface of glass fillers to form siloxane bonds with the aminopropyl group pendant to the surface. Silica surfaces that have been treated with triethoxyaminopropylsilane are compatible with resins produced by condensation, acylation, or alkylation reactions. These resins include epoxy, polyester, and polyamide resins. Another useful sizing reagent is 3-glycidoxypropyltrinmethoxysilane. The surfaces silanized with this reagent have pendant epoxide groups that can react with amines or alcohols in epoxy, polyester, and polyamide resins.

Another class of sizing reagents are bifunctional molecules that react with the silica surface and have vinyl groups that are capable of undergoing copolymerization with vinyl monomers used in radical polymerization processes. Sizing reagents can be developed that are highly selective for the particular polymer system being used. An example is U.S. Pat. No. 6,436,476 which discloses a bifunctional vinylbenzylsilane molecule that is used to modify the surface of glass fibers. The composite is prepared by ring opening metathesis polymerization (ROMP) with certain diolefin monomers.

Although much research has been done on the surface modification of fillers used in composites, there is a need to investigate new methods for increasing the bonding between the fillers and resins of composites to form composites with improved properties and adhesion.

SUMMARY OF THE INVENTION

The composite of the invention includes an interstitial polymer resin "IPR" attached to filler particles by a polyvalent tether. The polyvalent tether is a sizing reagent that is (1) attached by one or more covalent bond to the surface of the filler particles and (2) attached to the IPR by way of a multiplicity of covalent bonds and (3) can be attached by long tether lengths between the filler and the IPR. Prior to incorporation into the IPR, the polyvalent tether comprises a multiplicity of polymerizable units which can incorporate covalently into the IPR during in situ polymerization. The tether molecules are therefore polyfunctional, having the ability to (1) covalently bond to the surface of the filler and (2) to bond to the IPR by a multiplicity of functional groups that copolymerize with the monomers that are used to form the resin phase of the composite.

The filler particles may be composed of filler materials known in the art to introduce improved properties of composite substances, compared to the properties of the resin itself. The materials may be silica, glass, aluminosilicates, clays, and carbon fibers. The filler particles may be of regular shape, such as beads, spheres, fibers, rods, cubes, pyramids etc. The filler may also be of irregular shape such as amorphous silica, sand, and quartz. Some filler materials may have macroscopic organization or shapes. Common examples are woven glass fibers. Filler particles may be solid or hollow. An example of a hollow filler is hollow silica microspheres.

The composite of the invention in one embodiment is made by using polyvalent filler particles which are made by covalently linking the polyvalent tether to the filler particles. A plurality of polyvalent filler particles is then contacted with a solution of polymerizable resin. Generally, a form is used to contain the mixture. The particles are suspended in the mixture or contact each other in a regular or irregular way to form interstitial spaces between the surfaces of the filler particles. An interstitial polymer resin is then formed in the interstitial spaces by polymerizing molecular units in the resin solution which are capable of forming linear and/or branched polymers and which covalently incorporate two or more polymerizable units from the polyvalent tether attached to the filler particles. Such polymerization can be alone or in combination with polyfunctional cross-linking molecules.

Depending on the polymerizable units on the polyvalent filler particle and in the resin solution, the polymerization reaction may be initiated by free radicals, or by electrophilic or nucleophilic attack on the polymerizable units.

DETAILED DESCRIPTION OF THE INVENTION

Figure 1:
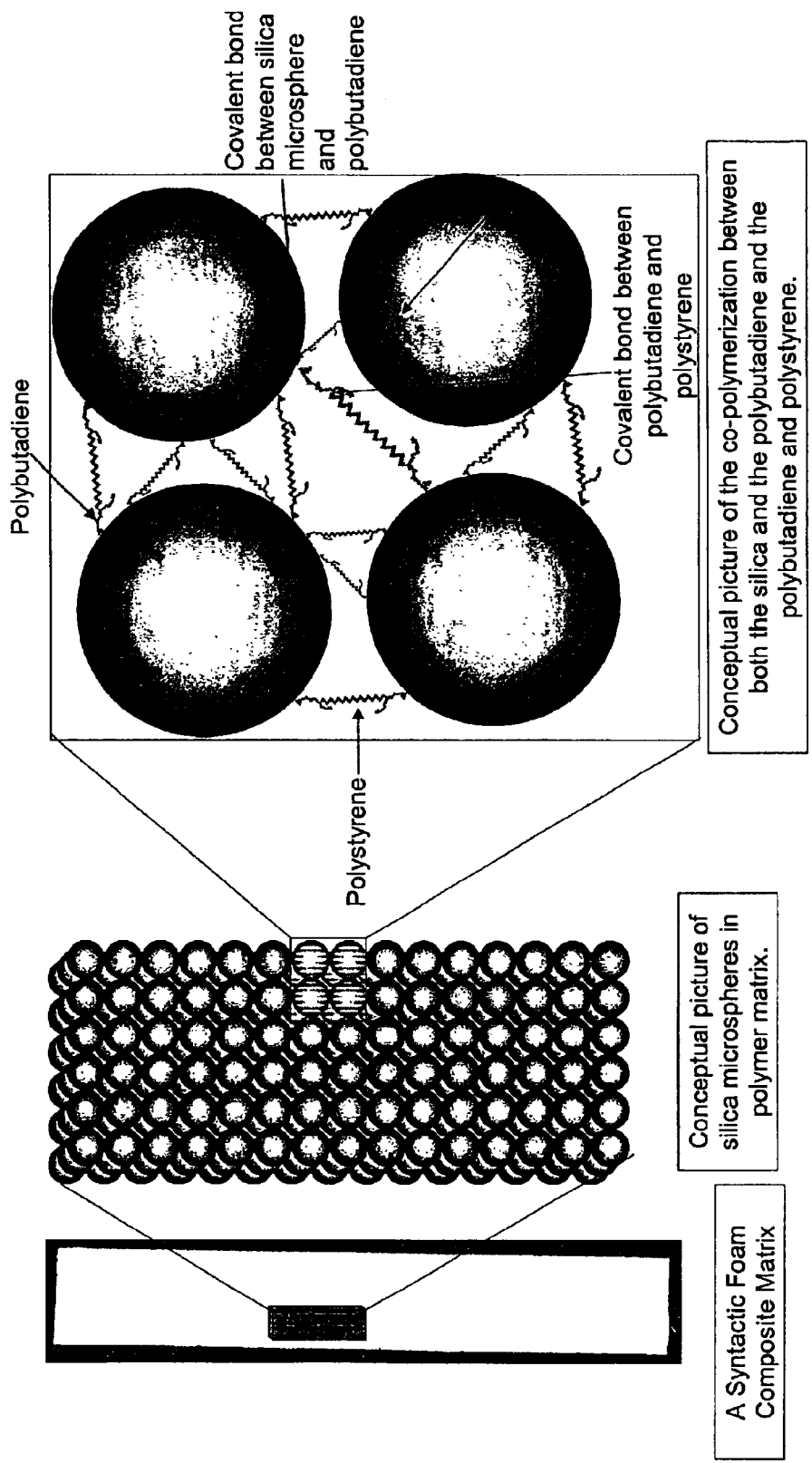
FIG. 1 is a conceptual diagram of a composite matrix with an interstitial polymer network. The right panel of the Figure shows a model of the polymer network in the interstitial spaces between the spheres.
Figure 2:
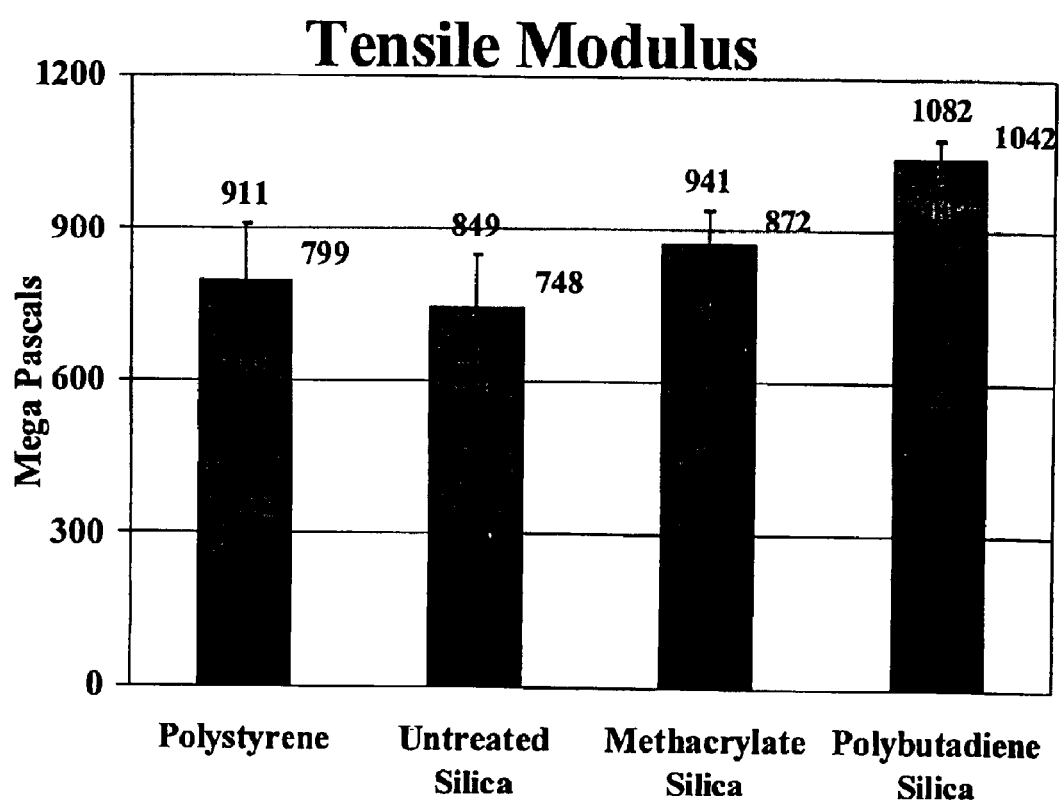
FIG. 2 depicts the tensile moduli of a crosslinked polystyrene resin, and syntactic foam composites with (1) no surface modification of silica microspheres (Untreated Silica), silica microspheres modified with 3-(Trimethoxysilyl)propyl methacrylate (Methacrylate Silica), and (3) silica microspheres modified with trichlorosilyl polybutadiene silica (Polybutadiene Silica). The results show that the addition of the polybutadiene crosslinker gave the largest increase in the tensile modulus measured in Mega Pascals, which is measured as the force per unit area needed to elongate the coupon by 100%. The average increases that were seen in the modulus of the polybutadiene silica were significant at the 99.9% level compared to the three other samples.
Figure 3:
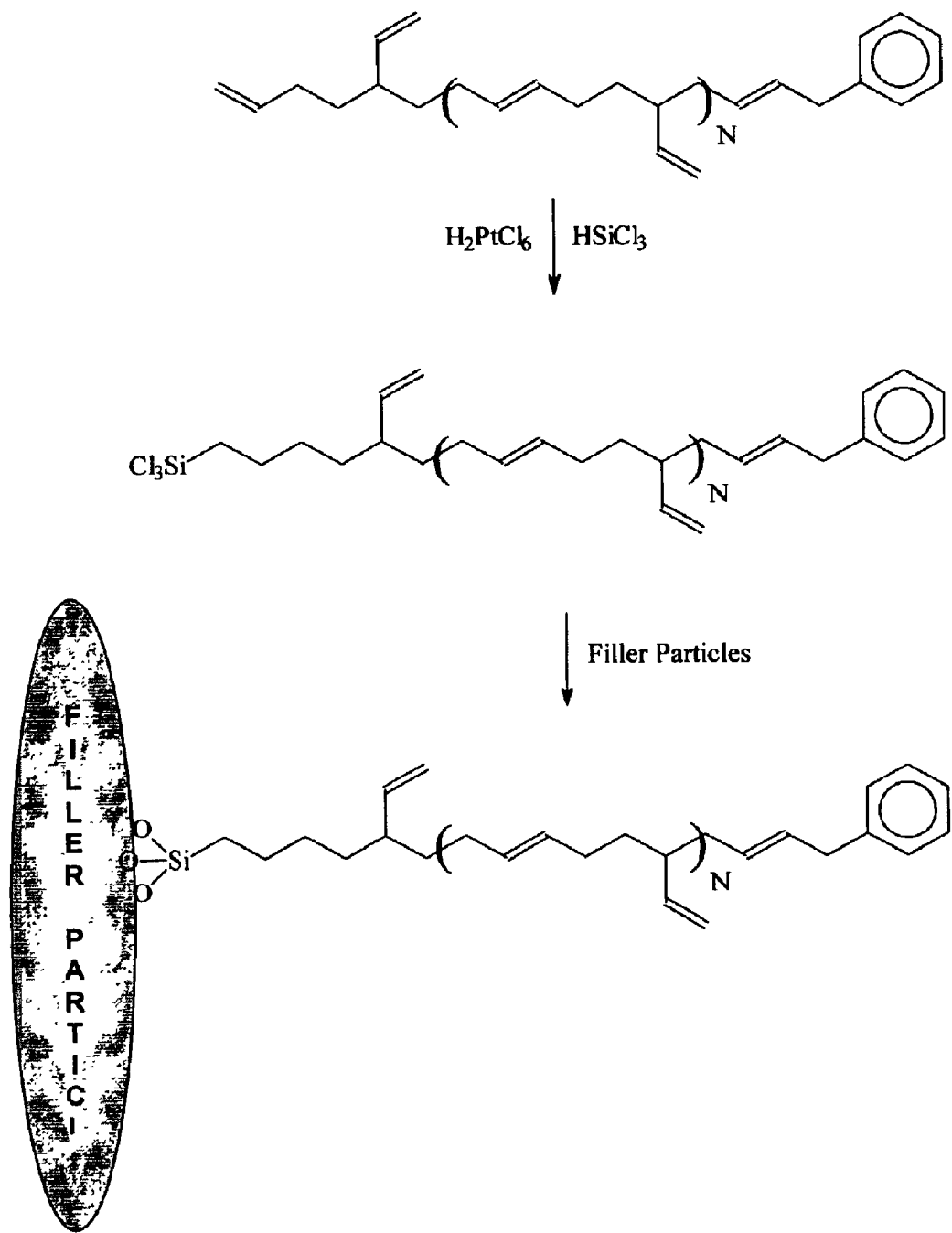
FIG. 3 shows the chemistry of functionalizing polybutadiene with trichlorosilane and reaction of the reagent to form a filler with a polybutadiene tether.

The invention relates to novel composite materials. The composite materials comprise filler particles having surfaces that define interstitial space within the composite. At least part of the interstitial space contains an IPR which is bound to the filler by a multiplicity of covalent bonds via a polyvalent tether. In some embodiments, the composite is substantially impervious to the flow of fluids such as gases and liquids through the IPR and among the filler particles.

1. Filler Particles

The function of the filler particles is to provide a matrix defining interstitial spaces and to provide a structure which contains and is covalently linked to the IPR. The filler particles used in forming the composite includes any substance which has a surface which can be modified so as to provide for the binding of the IPR to the particles by way of a multiplicity of covalent bonds. Such modification is generally by a covalent linkage of a polyvalent tether (as defined hereinafter) to the surface of the filler particle to form a "polyvalent filler particle." The solid filler can have a wide variety of sizes and shapes which will determine the general size and shape of the interstitial space in the composite. Preferred filler particles are not porous. Filler particles may comprise substances such as metals, metal oxides, resins, or glasses.

Particularly preferred filler particles include metal oxides (including but not limited to titanium oxide, zirconium oxide, chromium oxide, and iron oxide) and any other similar ceramic material including silicon nitride and aluminum nitride. The preferred mineral oxide supports of the present invention include silica, zirconium oxide, and titanium oxide. The most preferred mineral oxide is silica.

Some applications of the invention use low cost filler particles. Exemplary materials are quartz sand, beach sand, amorphous silica, clay, fiberglass, hollow or solid silica microspheres, and the like.

In some embodiments, polymer resin particles, preferably non-porous resin particles, can also be used as filler particles. Such resin particles preferably possess a surface containing chemical functionalities that provide a multiplicity of sites to which a polyvalent tether can be covalently attached. Synthetic resin particles include, without limitation, such materials as polystyrene, polysulfone, polyethersulfone, polyolefins (e.g., polyethylene and polypropylene), polyacrylates, polyvinyl acetate (and partially hydrolyzed versions thereof), ring-opening polymers, polyethers, epoxy polymers, modified epoxy polymers, polyesters, epoxy-polyesters, epoxy novolac resins, epoxy-polyurethanes, vinyl acrylics, styrenated acrylics, saturated or unsaturated polyesters, polyurethanes, polyamides, phenol-formaldehyde polymers, heterocyclic polymers, polysiloxanes, polyphosphazenes, and the like. The preferred resin supports are composed of resins that have structural rigidity. The most preferred resin supports are highly crosslinked polyacrylates and polystyrenes that are made by methods known to those skilled in the art of resin preparation. In some embodiments, the resin particle is formed as a copolymer with monomers having reactive moieties which provide a site for linkage with a polyvalent tether. In other embodiments, the monomers used to make the resin particles containing functional moieties capable of providing polyvalent tether linkage. Methods for making the foregoing are well known within the skill in the art of polymer chemistry.

The filler particles may be of regular shape, such as beads, spheres, fibers, rods, cubes, pyramids etc. The filler may also be of irregular shape. Filler particles may be solid or hollow. An example of a hollow filler is hollow silica microspheres. Hollow microspheres have the property of low mass to volume and surface area and are used in syntactic foam composites manufactured for light weight structures. The shape and nature of the filler particles used in making composite materials are well known in the art. The present invention has the advantage of providing improved properties to composites prepared with virtually any shape of filler material that is used for the specific material being produced.

The size of the filler particles is determined by the use of the composite article being produced and the requirements for its physical properties. For spherical and irregular shaped particles, the size ranges from colloidal silica and clays of 20 nanometers averaged diameter to particles that are up to a millimeter in diameter. Cylindrical particles such as glass fibers may have diameters ranging from approximately one micron to a millimeter. The length of the fibers used in a composite material formulation will depend on the use. In some cases the fibers used in chopped fiber preparations are 100 microns to 10 millimeters in length. Other fiber glass composites use fibers that may be up to meters in length and are used in wound or woven configurations.

In general, the size of filler particles used in composite formulations will affect the properties of the final manufactured product. It is obvious that the surface area to volume ratio of a particle decreases as its size increases. Since the adhesion of resins to fillers in composites known in the art is a function of the surface area of the particle, there are natural limitations and tradeoffs that conventional composite formulation and are forced to accept. If the particles are small, the surface area and area of the filler and resin interface is large, and adhesion between the resin in the filler is consequently greater. Unfortunately, the small size of filler particle may result in its imparting relatively little structural strength to the composite formulation. On the other hand, if the particles are large, the filler particles may contribute substantial structural strength to the composite, but the low surface area of the filler-resin interface may result in very little adhesion between the filler and resin phases. The sizing reagents used in state of the art surface treatments extend out from the surface of the filler a distance of from 0.4 1 to 2 nanometers. In order for covalent binding to occur between the resin and the reactive functional group of sizing reagents, the reaction must occur within the volume of the thin monolayer at the filler's surface.

It is a unique aspect of this invention that the long polyvalent tether molecules have the effect of increasing the surface area of the filler particles and the volume in which the resin can covalently bind to the polyvalent tether. This can be seen, for example, by considering the dimensional factors of a composite made with a resin and glass microspheres, such as the 35 micron diameter particles. If a conventional sizing reagent for radical polymer-based composites, such as 3-(trimethoxysilyl)propyl methacrylate is used, the distance from the surface of the filler to the olefin group is eight bonds or approximately eight Angstroms. For the growing polymer chain to react with the double bond of the methacrylate moiety, it must be within 8–10 Angstroms of the solid surface. The volume of this reactive region can be calculated as a fraction of the total volume of the IPR. Assuming the composite is formulated with 20 per cent of its volume occupied by the microspheres and 80 percent by the resin, the volume of the reactive region is 0.0021 percent of the volume of the IPR.

In contrast if a polyvalent tether such as trichlorosilane modified polybutadiene (420,000 Daltons) is used as a polyvalent tether, the distance that the polyolefin can extend from the surface of the filler is over 15,000 Angstroms. It is possible for growing polymer chain to crosslink with any of the olefinic groups of the polybutadiene tether in this reactive region up to approximately 15,000 Angstroms from the surface. This reactive volume can be calculated to 3.5% of the volume of the IPR. This amounts to a 1600 fold increase in the reactive volume for the composites of the present invention. The result of the use of a long polyvalent tether is an increase in the volume of the composite in which the resin and the sizing reagent (i.e. the polyvalent tether) can react by over 3 orders of magnitude.

The size of the filler particles used in composite materials is determined by the mechanical, physical, and structural requirements of the composite article of manufacture. In general, small filler particles contribute less structural strength to the composite aricle than larger particles. In contrast, small filler particles have a greater surface to mass ratio and will have more adhesion between the filler and the resin phases. The polyvalent filler particles of this invention can be larger than filler particles used with conventional sizing reagents known in the art. For composites that use cylindrical or fiber-shaped fillers, the diameters of the fibers are preferably between 1 and 10 microns and more preferable between 5–100 microns. For composites made with particles that are noncylindrical but regular or irregular in shape, preferred particle diameters are from 1–30 microns, preferably 10–40 microns, and more preferably 30–1000 microns. In many composite articles of manufacture the filler particles or fibers are arranged into macroscopic structures such as mats or windings that are virtually unlimited in size.

The solid materials can be selected for their advantageous properties of cost and the characteristics of composites made with them. A remarkable characteristic of the present invention is the variety of shapes and forms that the composites can be made in.

When the particles are assembled into the composite of the invention, the size and shape of the filler particles determines the dimensions of the interstitial spaces between and among the particles. In some embodiments, the dimensions of the interstitial spaces are determined by the solid packing characteristics of the particles. In such embodiments, the filler particles are assembled into a matrix, so that the filler matrix is dimensionally stable and will not shift or deform under the pressure of fluid flow of a polymerizable resin through the matrix. In other embodiments, the filler particles are spacially separated from each other but are covalently linked to each other via the IPR and the multivalent tether.

The coated reinforcing filler or fiber material may be used in continuous form, for example, in the formation of filament wound composites, or as input for a weaving or knitting process to make a fabric. The fabric may subsequently be used in a centrifugal casting process or as input for a molding process. In another embodiment, the composition is applied to reinforcing fibers used to manufacture filament wound composite articles, such as pipes.

2. Polyvalent Tethers and Polyvalent Filler Particles

As used herein, a "polyvalent tether" is a polyfunctional reagent that is capable of forming a spacer between the filler particle and the IPR The polyvalent tether has a first functionality which is capable of covalently binding to the filler particle by one or more covalent bonds. It also has a second functionality which comprises a multiplicity of polymerizable units which are capable of copolymerizing with the polymer resin used to form the IPR.

Polyvalent tether also refers to the form of the tether after it has been incorporated into the composite of the invention. It that case, the multivalent tether is covalently attached to the filler particle by one or more covalent bonds. It is also attached to the IPR by multiple covalent bonds formed during the copolymerization process between the tether and IPR.

In either case, the number of polymerizable units or the number of covalent bonds to the IPR maybe as low as 2, preferably greater than 3, more preferably greater than 4, more preferably greater than 5, still more preferably greater than 10, and most preferably greater than 100. The only limitation to the maximum number of multiple bonds to the tether molecule is the limit of the number of polymerizable units within the tether molecule. For example, polybutadiene 420,000 from Aldrich Chemicals has approximately 7800 reactive olefin units and therefore each tether molecule is capable of forming up to about 7800 covalent bonds with the IPR. Although it is unlikely that the IPR will form 7800 covalent bonds with each polybutadiene polyvalent tether, it is a consequence of chemical kinetics that the high local concentration of cross-linkable olefins on the polyvalent tether will substantially increase the probability and number of covalent bonds between the IPR and the filler.

The polyvalent tether molecule can be represented as the unit $R_1$—$R_2$ which is ultimately covalently attached to the filler particles. This can be represented as follows:

particle-$R_1$—$R_2$.

The $R_1$ group is chosen so as to be reactive with the surface of the particle to form a covalent bond between the particle and $R_1$.

$R_2$ may comprise any of the following formulas:

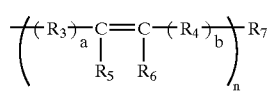
(1)

wherein $R_3$ and $R_4$ are independently alkyl $C_1$–$C_{10}$ and a and b are independently equal to 0 or 1; $R_5$ and $R_6$ are independently H, alkyl $C_1$–$C_4$ and aryl; $R_7$=H, alkyl, aryl, OH, $NH_2$, SH, O-alkyl $C_1$–$C_{10}$ and n=2–100,000, preferably 5–50,000, and still more preferably 100–50,000, and most preferably 50–10,000.

$R_2$ may also be:

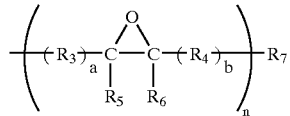

wherein each of the substiutents are the same as described above. $R_2$ may also be of the following formula:

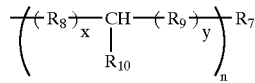

wherein $R_8$ and $R_9$ are independently alkyl $C_1$–$C_{10}$, O, NH; wherein x and y are independently 0 or 1; and $R_{10}$ is aryl, allyl, carboxylate, carboxylate esters, chloromethylene, substituted alkyl, vinyl and haloalkyl.

Without being bound by theory, the multivalent tether is advantageously used in the invention by way of the number of polymerizable units present in the molecule as well as by the length of the molecule. It is believed that the longer the length of the tether the greater the likelihood that the tether will react at multiple sites to copolymerize with the IPR as it is being formed.

Accordingly, the polyvalent tether molecules have a preferred minimum length from 15–30 atoms. More preferred tether lengths range from 30–200 atoms, 100–1000, more preferably 500–5000, still more preferably 1000–10,000, although there is, in practice, no upper limit. The most preferred tether molecule is amphiphilic in nature and will readily dissolve in a variety of solvents, ranging from water to hydrocarbons, and will be compatible with a variety of solution characteristics, including acidity/basicity, ionic strength, viscosity, temperature, dielectric constant, and solute and solvent reactivity.

Some examples of tether molecules useful with metal oxides such as silica include trichlorosilyl or alkoxysilyl derivatives of polyolefins such as polybutadiene. The trichlorosilyl or alkoxysilyl moiety reacts with the surface silica fillers to form from one to three covalent siloxane bonds. The derivatized filler is then contacted with mixtures of monomers, crosslinking reagents, initiators and reagents used by skilled practitioners to form polymer resins and composites. For example, during a radical polymerization process, the growing polyvinyl polymer chain has the opportunity to react with the double bonds of the polyolefin tether to create a multiplicity of crosslinks between the resin and the filler substance.

The polybutadiene tether can be converted to polybutadiene epoxide by reaction with epoxidation reagents including 3-chloroperoxybenzoic acid. To make an epoxy resin composite this tether-modified filler is contacted with amines and epoxides commonly used for preparing epoxy resins and the polybutadiene epoxide reacts multiple times with the amines in the resin mixture.

The multiple covalent bonds between the resin phase and the filler phase of the composites of the invention effectively make the composite a high molecular weight molecule with substantially all atoms covalently bound together. The purpose of the polyvalent tether of the present invention is to increase the frequency of crosslinks between the tether and the resin. Sizing reagents known in the prior art do not have this capability.

The tether molecule may be formed by a sequence of chemical reactions that covalently bind a polyvalent precursor molecule to the surface of the filler when subsequent chemical modification of the precursor results in the formation of a polymer tether. An example of such a synthetic sequence is the modification of polyvinyl alcohol to a polyether derivative by a conventional Williamson ether synthesis, using base and allyl bromide as the alkylating agent. The polyallyl ether of the polyvinyl alcohol is then reacted with one mole of trichlorosilane per mole of polymer. The resulting polyvalent tether molecule is thus a long polyether chain with pendant allyl ether groups that are capable of reacting with silica fillers and also undergoing copolymerization with vinyl monomers to form the composite of the invention. This species is then contacted with a silica filler and the trichlorosilane groups react with the surface of the silica to form siloxane bonds. Such particles are polyvalent filler particles as discussed hereinafter.

A similar synthesis involves a partial derivatization of polyvinyl alcohol with allyl bromide in the presence of base to make a mono or oligo allyl ether. The remaining groups of the polyvinyl alcohol are then esterified with acryloyl chloride or methacryloyl chloride to produce the acrylate or methacrylate esters. The allyl group of this molecule is then reacted with trichlorosilane in the presence of a hexachloroplatinic acid catalyst to make the trichlorosilane adduct. This polyvalent tether is then contacted with the silica filler and immobilized by the siloxane bonds formed. Thus, the polyvalent filler particle is contacted with vinyl monomers and radical initiators commonly used for composite manufacture.

The polyvalent tether molecule or reagent of the present invention may be applied to the reinforcing fiber material by any suitable method, to form a coated fiber or particle reinforcing material. For example, the reagent may be applied to the reinforcing tiber material atter it has been woven or knitted into a tabric as a finish. Alternatively, the silanizing agent of the present invention may be applied to filaments of a reinforcing fiber material immediately after they are formed in an on-line operation as a sizing, or the composition may be applied, off-line, to unwound strands of reinforcing fiber material that were previously formed and packaged. Further, the invention maybe applied as an overcoat to form a binder in the production of chopped strand or continuous strand mats. Methods for applying the coating composition include, but are not limited to, pads, sprayers, rollers or immersion baths.

The present invention may also be used to coat milled fibers or flake glass to make them more compatible with the interstitial polymer resin. In one embodiment, a solution of a reactant polyvalent tether is mixed with a flake or milled glass. The excess solution is drained from the mixture and the glass is dried in a fluidized bed or with hot air.

When the reinforcing fiber material is a continuous fiber strand, the polyvalent tether may be applied by contacting the fiber strand with a roller applicator containing the a solution of the polyvalent tether. In such a process, the speed of the roller applicator can be varied to change the amount of tether that is applied to the surface of the continuous fiber strand. Accordingly, it is possible to increase or decrease the level ot impregnation ot the continuous fiber strand with the polyvalent tether, and, accordingly, the amount of tether present on the surface of the continuous fiber strand, by decreasing or increasing the speed of the roller applicator.

The first step in preparing the composites is selecting a filler particle which has a surface which is capable of forming strong bonds with the polyvalent tether. Many organic polymer resins possess reactivity that is favorable for grafting the polyvalent tether to the particle surface. The grafting of the tether to the solid surface can occur by a wide variety of chemical reaction mechanisms commonly known to those skilled in chemistry, including free radicals, and electrophilic or nucleophilic attack. Examples of such solid support surfaces could include, without limitation, resins with halogen, amino, alcohol, thiol, hydrazine, phenyl, vinyl, carbonyl, nitrile, alkyl, silyl, oxo, nitrido, sulfido, phosphino, imino, and alkynyl functionalities.

A preferred embodiment of forming a covalent bond between a polystyrene filler particle and a polyvalent tether makes use of the well known Friedel Krafts reaction of methyl chloromethyl ether with polystyrene particles in the presence of Lewis acid catalysts to make the chloromethyl derivative of polystyrene. This can be reacted with polynucleophiles to prepare particles with pendant polyfunctional chains. A preferred embodiment is derivatization with polyvinyl alcohol by reacting the polyvinyl alcohol with chloromethylpolystyrene particles in the presence of a base such as sodium hydroxide or sodium methoxide in a methanol suspension. The alcoholate displaces the benzylic chloride to form an ether bond to the polystyrene. The reaction is worked up by filtration, and rinsing with methanol and dichloromethane. The next step of forming the polyvalent tether is to polyacylate the pendant polyvinyl alcohol with acryloyl chloride or methacryloyl chloride. If polyvinyl alcohol 124,000–186,000 daltons is used, the resulting filler particle is coated with a multiplicity of tether polymers, each of which has about 1,000 acrylate or methacrylate ester groups which can copolymerize with vinyl monomers to form a composite product. The reaction mechanisms for binding the polyvalent tether to the reactive particle surface can include free radical abstraction and addition, free radical combination, nucleophilic addition, electrophilic addition, condensation reactions, and the like.

3. Interstitial Polymer Resin (IPR)

It can be appreciated that the interstitial spaces in the filler particle matrix can be found in a number of shapes, sizes, and geometries and in many situations is highly irregular. The size of the interstitial spaces between arrays of particles is a function of the particle shapes and the average particle diameters. The preferred dimensions of the interstitial spaces can be defined by the distance between any point in the interstitial space and the nearest solid support surface. By way of example, if there is a point in the interstitial space that is 10 micrometers from the nearest filler surface, then it is desirable that the IPR be of a molecular weight and size that is at least 10 micrometers in length, so it can extend from the support to the center of that interstitial space. While it is difficult to know the exact distances from points in the interstitial spaces to the support surfaces, it is simple to define a composite matrix by the size and shape of particles that is can be constructed with. For some applications it is useful to use particles with average diameters of 1–10 microns. Preferred particle sizes for the particles are from 40–1000 microns. The most preferred average particle sizes for the solid support are from 10–400 microns.

For embodiments of the present invention in which the interstitial space is wholly or partially cylindrical in shape, such as fibers, tubes, capillaries, and the like, preferred diameters of the interstitial spaces are 5–15 microns and from 200–1000 microns. The most preferred diameters are from 15–200 microns. For embodiments in which the interstitial space is comprised of the void volumes between particles packed in a matrix, the irregular geometry of the interstitial spaces only allows approximate definitions of the size of the interstitial spaces. Preferred maximum distances between adjacent particles in the matrix are from 1–1000 microns. More preferred interstitial distances are between 2–200 microns, while the most preferred interstitial distances are between 3–50 microns.

The IPR can be composed of any of the polymer resins known to skilled artisans and used for the construction of composites. Such resins have the general characteristics of being formed by polymerization of one or more monomers. Synthetic resins include, without limitation, monomers which polymerize to form polystyrene, polysulfone, polyethersulfone, polyolefins (e.g., polyethylene and polypropylene), polyacrylates, polyvinyl acetate (and partially hydrolyzed versions thereof), ring-opening polymers, polyethers, epoxy polymers, modified epoxy polymers, polyesters, epoxy-polyesters, epoxy novolac resins, epoxy-polyurethanes, vinyl acrylics, styrenated acrylics, saturated or unsaturated polyesters, polyurethanes, polyamides, phenol-formaldehyde polymers, heterocyclic polymers, polysiloxanes, polyphosphazenes, and the like.

The IPR is made by contacting the polyvalent filler particles with the monomer, monomers, or solution of monomers. In one embodiment that utilizes polystyrene and silica beads with a polybutadiene polyvalent tether to make a syntactic foam composite, the composite is prepared by filling the mold with the polybutadiene-silica microspheres. A solution of styrene, divinylbenzene crosslinker, and a radical initiator such as dibenzoyl peroxide is then poured into the mold. The mixture is degassed by evacuating the mold compartment with a vacuum pump to remove any dissolved oxygen inhibitor and to permit the monomer solution to solvate the polyvalent filler particles. Polymerization is initiated by heating the mold to a temperature of 70–100 degrees Celsius to decompose the benzoyl peroxide and generate benzoyl radicals that initiate free radical polymerization of the styrene and divinylbenzene crosslinker.

Some of the growing radical chains react with and add to a double bond of the polybutadiene tether to create a crosslink of the polystyrene-divinylbenzene chain and the polyvalent tether. The reaction of the polystyrene with the polybutadiene tether is well known from the art of formulating high impact polystyrene, which is a copolymer of styrene and polybutadiene. The polymerization is continued until the monomers have reacted and the composite hardens. It is cooled, removed from the mold, and may be machined into articles of manufacture.

According to the aspects of the present invention involving radical polymerizations to form the IPR, polymerization is effected in the presence of an effective amount of a polymerization initiator, for example, thermal initiators such as ammonium persulfate/tertiary amine, nitriles or transition metals. Other examples include 2,2-azobis(2-amidinopropane) hydrochloride, potassium persulfate/ dimethylaminopropionitrile nitrile, 2,2-azobis-(isobutyronitrile), 4,4-azobis(4-cyanovaleric acid), or benzoylperoxide. Polymerization begins, as is known in the art, e.g., with agitation, exposure to heat, or exposure to a sufficient amount of radiant energy.

In another aspect of the invention, crosslinking agents are used to increase the structural rigidity and to promote the formation of multipoint attachment of the IPR to the solid support matrix. It is known to artisans in polymer science that crosslinking of polymers can significantly affect the properties of polymeric materials. Without wishing to be bound by theory, it is probable that the IPR's of the present invention have crosslinks between functional polymer chains. The crosslinks can be formed by, for example, radical chain transfer and combination processes.

Crosslinking reagents are well known in polymer science. The crosslinking agents useful for the free radical initiated polymerizations in the present invention comprise vinyl monomers having at least one other copolymerizable group, such as double bond, a triple bond, an allylic group, an epoxide, an azetidine, or a strained carbocyclic ring. Preferred crosslinking agents having two double bonds include, but are not limited to, N,N-methylenebis-(acrylamide), N,N-methylenebis-methacrylamide), diallyl tartradiamide, allyl methacrylate, diallyl amine, diallyl ether, diallyl carbonate, divinyl ether, 1,4-butanedioldivinylether, polyethyleneglycol divinyl ether, and 1,3-diallyloxy-2-propanol. Since the IPR of the present invention interconnects filler particle surfaces that may be separated by large distances on a molecular scale, preferred crosslinking agents comprise bifunctional reagents that have the crosslinking copolymerizable group attached to a polymer molecule and separated by spacers comprising from 12–24 atoms long or from 120–240 atoms. More preferred crosslinking agents have polymer spacer regions from 24–120 atoms separation. The most preferred crosslinking agents are bifunctional molecules with polyethylene glycol or polypropylene glycol spacer regions that are modified at both ends with the reactive group that is capable of crosslinking with the polymer chain of the IPN. Most preferred examples of polyethylene glycol crosslinkers that are capable of free radical copolymerization are bis-acrylamidopolyethylene glycol, bis-methacrylate esters of polyethelene glycol and his 4-methylstyryl polyethylene glycol.

The preferred crosslinker concentrations range from 0.001–0.10 molar fraction of crosslinker in relation to monomer concentration. Crosslinking reagents commonly used in the art can be employed in the preparation of the composites of the present invention. A preferred length of the molecular distance between the two polymerizable groups of the crosslinker is from 6 atoms to 10 atoms. A more preferred length of the molecular distance between the two polymerizable groups of the crosslinker is from 20 atoms to 200 atoms. The most preferred crosslinker length is from 50–150 atoms.

In other embodiments, composites can be made from polyvalent fillers and epoxy resins. Epoxy resins are generally prepared by mixing a diamino or oligo amino compound with a bis-epoxy or oligo epoxy reagent. The nucleophilic attack of the nitrogen on the epoxide function occurs to create a multiplicity of covalent bonds and a highly crosslinked resin. A polyvalent particle and that is appropriate for preparing the epoxy composites of the present invention could be a filler modified with a poly-epoxide such as polybutadiene epoxide or its adduct formed by reaction with a diamine or oligo-amine such as ethylenediamine. Other polyvalent tethers that can be used in are polyglycidyl methacrylate or its ethylene diamine adducts. Another advantageous tether polymer that can be used is poly-epichlorohydrin. The chloromethylene groups readily form multiple covalent bonds to the amino functionalities used for preparing epoxy resins.

It can be appreciated that a wide variety of IPR and polyvalent filler combinations can be used to produce composite matrices. The general principal is to have the polyvalent tether molecule be substituted with a plurality of functional groups that react with the monomers that are used to make the polymer-filler. When polymerization occurs by any of the polymer-forming mechanisms known in the art, the polyvalent tether simply participates in the polymerization reaction as a macromonomer and forms a plurality of covalent bonds between the resin and the polyvalent filler particles.

4. Composite Formation

A preferred and exemplary technique is to pack filler particles into a form which will define the shape of an article of manufacture. A suspension of tether modified filler particles is passed through the form with an exit port with a filter to retain the filler particles. In some cases high flow rates and pressures are used alone or in combination with form vibration to create a stable and well packed bed in the form. The liquid is then drained from the form and a polymerizable resin is introduced into the interstitial space and polymerized. Alternatively a suspension of the tether modified filler particles in polymerizable resin is passed into or through the form. When passed through the form, an exit port in the form with an appropriate sized filter is used to retain the filler particles.

In other embodiments, laminated structures can be formed by techniques well known in the art. An epoxy fiberglass laminate can be prepared by modifying woven glass fabric with the reagents described herein for making polyvalent filler materials. The polyvalent amine or polyvalent epoxide-modified glass fabric is formed in the shape of the desired structural composite. A mixture of epoxy resin and amine hardener is poured over the fabric in a manner that permits contact between the monomer mixture and the fibers of the glass fabric. The resin is permitted to set at a temperature and time commonly used for making fiberglass laminates. It can be appreciated that the invention requires no modification of practices or equipment used in preparing composite articlews of manufacture. The unique aspect of the present invention is the polyvalent tether that is bound to the filler prior to construction of the composite substance.

A preferred set of conditions for synthesizing the composites is to conduct the in situ polymerization at high concentrations of the polymerizable molecules for a time sufficient polymerize the resin into an impermeable mass of polymer in the interstitial spaces. It is believed, without relying on theory, that it is preferable to perform the polymerizations so as to produce polymer chains of high molecular weight. High concentrations of polymerizable molecules are generally favorable for the production of high mass polymers.

The composite of the present invention is finally prepared by contacting the solid support matrix with a solution of monomers and crosslinkers and initiating reagents that will polymerize to form the IPR, or by contacting the solid support with a solution of preformed polymers and condensing or initiating reagents that crosslinked the preformed polymers to form the IPN.

This is in general effected by conducting the polymerization in a manner that grafts or bonds the polymer network to the solid support with two or more points of attachment to the solid support matrix. The preferred method of constructing the IPN within the support matrix is generally conducted by in situ reactions that contact the reagents with the solid support matrix.

The composites of the invention in some embodiments are characterized by a modulated property compared to the same property in a composite having the same components except that the interstitial polymer resin is otherwise covalently attached to the filler particles by less than a multiplicity of covalent bonds. In a preferred embodiment, the comparison is to a composite having one covalent bond to the IPR, more preferably two covalent bonds to the IPR and in some instances five or ten covalent bonds to the IPR. Properties include at least one of modulation of tensile strength, tensile stiffness, elasticity and Young's Modulus.

It can be appreciated that a great variety of composite structures can be prepared by the methods disclosed in the present invention, but using other polymer chemistries and methods of forming polymers.

EXAMPLE 1

Addition of Trichlorosilane to Polybutadiene

Polybutadiene, (5.0 grams) molecular weight 420,000 (Aldrich Chemicals) was dissolved in dry toluene (114.2 grams). Chloroplatinic acid catalyst solution (50 microliters of a 10 mg/mL solution in THF was added. The solution was vigorously stirred under dry nitrogen while 12 microliters of trichlorosilane were added. The solution was allowed to react 2 hours and room temperature. It was then stored under dry nitrogen at 4 degrees.

EXAMPLE 2

Silanization of Silica Filler with Trichlorosilyl Polybutadiene

Silica microspheres (5.6 grams, Aldrich Chemicals, 11 micron average particle size) was dried in an oven at 150 deg for 24 hours in a round bottom flask. The silica was cooled to room temperature under dry nitrogen and suspended in 86 ml dry toluene. A solution of trichlorosilyl polybutadiene in toluene (1.0 mL), prepared by the method of EXAMPLE 1, was added. Pyridine (3 ml) was added and the flask was rotated under nitrogen for 24 hours. The polybutadiene coated silica was worked up by filtering, washing with toluene, and drying.

EXAMPLE 3

Preparation of Resin Test Rods

An amount of 10.230 g of resin (Evercoat Premium Marine Resin, Cincinnati, Ohio). was added to a scintillation vial. Then, 0.125 g of initiator provided in the resin kit was added to the resin. The resin and initiator were then mixed using a pipette. The mixture was removed from the vial by the pipette and injected into a plastic drinking straw, which was closed off at the bottom by a paperclip. The resin was allowed to set for two days.

EXAMPLE 4

Preparation of Resin Test Rods with 6% by Mass Silica Filler

An amount of 17.821 g of resin (Evercoat Premium Marine Resin, Cincinnati, Ohio.) was added to a scintillation vial. Then, 1.067 g of 10-micron silica particles were added to the resin. The silica and the resin were then mixed using a pipette. Following this, 0.268 g of initiator was added to the resin. Using another pipette, the initiator was mixed with the resin and silica. Using the pipette, the mixture was removed from the vial and injected into drinking straws that were closed off at the bottom by a paperclip.

EXAMPLE 5

Preparation of Resin Test Rods with 6% by Mass Silica Filler with Covalently Bound Polybutadiene An amount of 16.328 g of resin (Evercoat Premium Marine Resin, Cincinnati, Ohio.) was added to a vial. Then, 1.206 g of 10-micron polybutadiene-silica particles were added to the vial. The polybutadiene-silica and the resin were then mixed using a pipette. 0.047 g of initiator was then added to the resin. Using another pipette, the initiator was mixed together with the resin and polybutadiene-silica Using the pipette, the mixture was removed from the vial and injected into plastic drinking straws that were closed off at the bottom by a paperclip.

EXAMPLE 6

Preparation of Resin Test Rods with 3% by Mass Silica Filler with Covalently Bound Polybutadiene Using a pipette, 21.077 g of resin were added to a vial. Following this, 0.627 g of 1 0-micron polybutadiene-silica particles were added to the vial. The polybutadiene-silica and the resin were then mixed by shaking the vial. Then, 0.257 g of initiator was added to the resin and polybutadiene-silica. The initiator was mixed in with the resin and polybutadiene-silica by shaking the vial. Using the pipette, the mixture was removed from the vial and injected into a drinking straw that was closed off at the top and bottom by a paperclip, and allowed to set for two days.

EXAMPLE 7

Testing of Resin Rods

The composites were removed from the drinking straw molds using a razor blade. A homemade tensile stiffness testing device was set up that applied an increasing load to the composites and measured elongation in units of millimeters per gram. The results of the tensile stiffness tests are shown in Table 1. It is clear that the composites prepared with the polybutadiene tether had increased stiffness relative to the composites prepared with a silica filler lacking a tether.

TABLE 1

| Rod Label | Tensile slopes (mm/g) |
|---|---|
| 3% Silica | 0.00182 |
| 3% PBD | 0.00144 |
| 6% Silica | 0.00215 |
| 6% PBD | 0.00406 |

EXAMPLE 8

Preparation of Test Coupons and Measurement of Tensile Strength

The composites were polymerized in two molds. The molds were made by sandwiching a 2.0 mm Teflon tubing between two glass plates with the dimensions of 12 inches by 12 inches. The Teflon tubing acted both as a retainer for the styrene-silica slurry and also as a spacer. Styrene (300 ml) was added to a flask. Then, divinyl benzene (5 mole percent) was added to the flask. The divinyl benzene is commonly used as a crosslinker in polystyrene plastics. To remove the inhibitor and deoxygenate the solution, 7 grams of alumina were added along with chips of dry ice. To remove the alumina, the mixture was syringed through a filter and into separate bottles each containing 27 grams of either polybutadiene coated microspheres or untreated microspheres. Benzoyl peroxide (0.10 mole percent) was then added to each bottle to begin polymerization.

The bottles were then put into a vacuum desecator to remove any gases that were in the mixture or that were surrounding the silica. The slurry was then shaken and then pipetted through the top of the molds. The glass plates were held together by paper clips, which were clamped along the perimeter of the molds. The molds were then placed in water in a garbage can that was heated by an immersion heater. After polymerization for 72 hours at 76 degrees, the composite plates were then removed from the mold. Using a 9" bandsaw, the plates were cut into the shape of rectangles. The rectangles were put into a stress/strain apparatus purchased through the school. The data were recorded with an accuracy of hundredths of a Newton and the amount that the coupons were stretched was in 360th's of a millimeter per tenth of a second.

Once the coupons were cut out they were placed in a Stress/Strain Apparatus from Pasco Scientific (Roseville, Calif., www.Pasco.com). This device was able to detect stretching of the coupons down to 360th's of a millimeter and hundredths of a Newton. It collected a point every one tenth of a second. Coupons were cut out of both the polybutadiene silica composite and the untreated silica composite. The units that were measured were MegaPascals of force applied per millimeter of stretching of the composite.

Using this raw data, Young's Modulus could be found. Young's Modulus is used to determine how many MegaPascals of force it would take to stretch the coupon one millimeter during the first part of the test, when the composite is most flexible. Young's Modulus can be found by finding a best-fit line for the slope at the beginning of the Stress/Strain curve, when the line is almost linear, and is the common means of expressing the tensile strength of materials.

What is claimed is:

1. A composite comprising filler particles covalently linked to an interstitial polymer resin (IPR) by a polyvalent tether, wherein a first part of said polyvalent tether is covalently attached to said particles and a second part of said polyvalent tether is covalently attached to said IPR by a multiplicity of covalent bonds and wherein said IPR and said polyvalent tether provide a covalent linkage among said filler particles.

2. The composite of claim 1 wherein said polyvalent tether is at least ten atoms in length and has at least two points of attachment to said IPR.

3. The composite of claim 2 wherein said polyvalent tether is linear and has at least five points of attachment to said IPR.

4. The composite of claim 2 wherein said polyvalent tether is branched.

5. The composite of claim 1 wherein said polyvalent tether comprises a polyolefin.

6. The composite of claim 1 wherein said IPR is made from polymerizable units selected from the group consisting of styrenes, epoxides and vinyl carboxylates.

7. The composite of claim 1 wherein said composite is substantially impervious to fluid.

8. The composite of claim 1 wherein said composite has an enhanced property compared to a composite having an interstitial polymer resin covalently attached to said filler particles by less than a multiplicity of covalent bonds, wherein said property is at least one of tensile strength, tensile stiffness and Young's Modulus.

9. The composite of claim 1 herein said filler particles comprise solid particles.

10. The composite of claim 9 wherein said solid particles are regular in shape.

11. The composite of claim 10 wherein said solid particles are beads or fibers.

12. The composition of claim 11 wherein said particles are fibers.

13. The composite of claim 12 wherein said fibers comprise fiberglass, carbon fibers, synthetic fibers or natural fibers.

14. The composite of claim 1 wherein said filler particles are irregular in shape.

15. The composite of claim 1 wherein said filler particles comprise hollow particles.

16. The composite of claim 15 wherein said hollow particles comprise spheres.

17. The composite of claim 11 wherein said spheres comprise silica microspheres.

18. The composite of claim 1 wherein said IPR comprises a cross-linked polymer.

19. An article of manufacture comprising the composite of claim 1.

* * * * *